(12) United States Patent
Nygard et al.

(10) Patent No.: US 7,829,860 B2
(45) Date of Patent: Nov. 9, 2010

(54) PHOTON COUNTING IMAGING DETECTOR SYSTEM

(75) Inventors: Einar Nygard, Askar (NO); Jan S. Iwanczyk, Los Angeles, CA (US); William C. Barber, Valencia, CA (US)

(73) Assignee: DxRay, Inc., Northridge, CA (US)

( * ) Notice: Subject to any disclaimer, the term of this patent is extended or adjusted under 35 U.S.C. 154(b) by 182 days.

(21) Appl. No.: 11/591,000

(22) Filed: Oct. 31, 2006

(65) Prior Publication Data

US 2008/0099689 A1    May 1, 2008

(51) Int. Cl.
*G01T 1/00* (2006.01)

(52) U.S. Cl. .......................... 250/370.09; 250/370.08; 250/366; 250/394

(58) Field of Classification Search ............ 250/363.01, 250/363.04, 366, 369, 551, 370.08, 370.09, 250/394
See application file for complete search history.

(56) References Cited

U.S. PATENT DOCUMENTS

| | | | | |
|---|---|---|---|---|
| 4,288,692 A | * | 9/1981 | Schamber et al. | ............ 250/310 |
| 4,591,984 A | * | 5/1986 | Mori | ..................... 250/363.07 |
| 4,893,015 A | * | 1/1990 | Kubierschky et al. | ....... 250/369 |
| 5,363,055 A | * | 11/1994 | Ribner | ........................... 330/9 |
| 6,690,019 B2 | * | 2/2004 | Stettner et al. | .......... 250/370.08 |
| 6,953,935 B1 | | 10/2005 | Hoffman | |
| 7,521,682 B1 | * | 4/2009 | Holland et al. | ......... 250/370.01 |
| 2002/0109091 A1 | * | 8/2002 | Overdick et al. | ......... 250/336.1 |
| 2006/0056581 A1 | * | 3/2006 | Hoffman et al. | .............. 378/19 |
| 2007/0023669 A1 | * | 2/2007 | Hefetz et al. | ........... 250/370.14 |
| 2008/0001095 A1 | * | 1/2008 | Astley et al. | ........... 250/370.09 |
| 2008/0061395 A1 | * | 3/2008 | Tkaczyk et al. | ............. 257/443 |
| 2008/0069297 A1 | * | 3/2008 | Hoffman | ..................... 378/19 |

OTHER PUBLICATIONS

Hilgers, M. et al., "Development of a radiation hard version of the analog pipeline chip APC128", Nuclear Instruments and Methods in Physics Research; Section A, vol. 481; Elsevier Science; 2002; pp. 556-565.*

* cited by examiner

*Primary Examiner*—David P Porta
*Assistant Examiner*—Yara B Green
(74) *Attorney, Agent, or Firm*—Christie, Parker & Hale, LLP (57) ABSTRACT

An imaging detector system includes a radiation detector having a plurality of pixels for generating a plurality of detection signals in response to radiation. Each of the pixels is used to generate a corresponding one of the detection signals. The imaging detector system includes a plurality of photon counting channels. Each photon counting channel is coupled to a corresponding one of the pixels to receive and process the corresponding one of the detection signals. Each photon integrating channel is coupled to a corresponding one of the pixels to receive and process the corresponding one of the detection signals. An image processor receives outputs from the photon counting channels and the photon integrating channels, wherein the image processor is adapted to generate an image using the received outputs.

20 Claims, 9 Drawing Sheets

PHOTON COUNTING IMAGING DETECTOR SYSTEM

FIELD OF THE INVENTION

This invention relates to x-ray imaging systems and more particularly to new generation x-ray detectors for Computer Tomography (CT).

BACKGROUND

CT scanners have become one of the most widespread modalities for diagnostic imaging because of the soft tissue contrast and spatial resolution of images that can be produced by the CT scanners. Recent studies indicate that CT imaging can greatly increase the detection of small non-calcified nodules as compared with planar chest radiography. Accordingly, there is an increasing interest in CT scanning. By way of example, lung cancer screening has been receiving significant attention in recent years.

Since human exposure to x-rays is generally harmful, the risk of patient radiation exposure should be significantly less than the risk of undetected pathologies that can be treated at early stages to affect a better outcome. Accordingly, the benefit of CT screening must outweigh the risk of the additional radiation exposure for a particular application. For CT to be a successful modality in screening, detectors and scanning technologies that can assure delivery of a very low dose of radiation to the patients without sacrificing imaging quality, should be developed.

X-ray detectors play a very important role in the performance of a CT scanner. CT detector technologies have continually changed over years in a tremendous effort to improve performance. The first clinical CT systems used detectors that were typically based on high-pressure inert gases (usually xenon). Examples of these models are the GE 7800, GE 8800, and GE 9800. A disadvantage of xenon detectors is their low detection efficiency due to the relatively low density of gas. Although various efforts have been made to improve the performance of these detectors by increasing the pressure of the xenon chamber, the gas detector still falls short in terms of detection efficiency as compared to solid-state detectors coupled to scintillators. An advantage of the xenon detector is its low cost.

To improve efficiency, newer models began to use solid state detectors based on silicon (Si) photodiodes optically coupled to scintillating materials such as $CdWO_4$ or custom produced scintillating ceramics. Si detectors coupled to scintillators overcome the efficiency limit of xenon detectors. In these detectors, optical photons, induced by an x-ray interaction in the scintillator, travel toward the photodiodes and produce an electrical signal. A total light signal originates from multiple interactions of x-ray photons with the scintillator and is consequently converted to an electrical signal by the photodiodes and read out by external electronic circuitry. The analog signal from the detector then is digitized with data acquisition electronics.

Currently, CT systems use such a detector that includes Si photodiodes that are optically coupled to a scintillator. The need to obtain the soft tissue contrast and spatial resolution desired in reconstructed images places high demands in terms of intrinsic spatial resolution and dynamic range on the detector. To meet such demands, the typical size of pixels in CT detectors is about 1 mm, and as there can be a tremendous flux of x-rays delivered to the detectors (about $100 \times 10^6$ photons/$mm^2$/second in air without the patient) a large dynamic range of linear response is required.

The detector is typically operated in an integrating mode where the detector generates a signal proportional to the total energy deposited as a function of time. An incident x-ray photon undergoes a photoelectric interaction with a scintillation converter which emits visible or ultra violet light. This light reaches the photodiode component which provides an electrical signal (current) proportional to the energy fluence of x-rays. Thus as the current is being monitored, these detectors are often referred to as operating in 'current mode'.

Current mode read out integrates both the signal and noise from the detector and electronics over time. Furthermore, the x-rays in CT have a broad spectrum of energies. When either the count rate or the x-ray energies are low, the signal from x-rays must exceed a noise level produced by the detector and readout electronics. Thus there is a minimum threshold in terms of x-ray flux that can be reliably detected, which increases as the x-ray energy decreases. Thus, in conventional current mode CT detectors, there is a distinct non-zero lower limit on the dynamic range. The noise limit in clinical whole body CT scanners places a limit on soft tissue contrast. Despite these limitations, current mode x-ray detectors are used currently in virtually all clinical x-ray systems including CT and digital radiography.

Conventional CT systems utilize detectors that convert energy into current signals that are integrated over a time period, then measured and ultimately digitized. A drawback of such detectors however is in their inability to provide data or feedback as to the number and energy of photons detected. As previously mentioned, one problem with these detectors is that there is a lower limit of detection defined by noise in the detector such that a certain pixel with no incident radiation may produce some signal due to thermal and shot noise.

There are additional deficiencies of integrating systems, such as not taking advantage of statistical information carried by each photon (e.g., 3 photons of 30 keV carry the same information as one photon of 90 keV) and not using information about the energy of the counted photons. For example, because a poly-energetic x-ray spectrum is used, each detected photon also contributes different information to the resulting image depending on density and elemental composition of the examined tissue. Utilization of the energy information carried by individual photons can lead to further improvement of the quality of the image and/or reduction of the radiation dose. This is accomplished by optimal energy weighting to increase soft tissue contrast. Because of these limits inherent in current mode detectors, there has been a mounting effort to move away from this technique and explore photon counting detectors for x-ray imaging applications such as CT, digital radiography, and mammography.

However, a drawback of photon counting detectors is that these types of detectors generally cannot count at very high x-ray photon flux rates typically encountered with conventional CT systems. The very high x-ray photon flux may lead to nonlinear detector system responses and ultimately a saturation of the detector system. This saturation can occur particularly at a detector location wherein the boundary of the subject is imaged and a very small thickness of the tissue (or none) is placed between the detector and the x-ray generator. For example, when x-rays are passed through a person through a thicker part of the person's body, the x-rays have a higher probability of being attenuated. In other words, the flux of x-rays that passes through the person and thus reaches the detector, is much reduced at the thicker part of the person's body. However, when the beam of x-rays is passed through a thinner part of the person's body near the edges, a very high count rate is detected. In other words, a very high x-ray flux is detected at the edges of the person. This problem can be mitigated to a certain degree by placing a bow-tie shaped filter between the subject and the x-ray generator in order to equalize total attenuation and reduce x-ray photon flux at the subject peripheries. However, this technique has limitations due to problems optimizing the filter due to the fact that members of the subject population do not have a uniform body shape and are not exactly elliptical in shape.

A number of techniques have been tried to avoid saturation problems in CT detector systems. One such technique involves reducing the x-ray flux by using a lower current at the x-ray tube and hence a lower x-ray flux. This will lead to an increased scan time which will be needed to acquire images that meet the required statistics to obtain good image quality. The increased acquisition time in turn can lead to a blurring of images due to organ movement within the scan time. Other solutions include software correction algorithms. Unfortunately, software solutions may create image artifacts because of an inability to perfectly replace the saturated data. Another solution is explored in U.S. Pat. No. 6,953,935 B1 (GE patent).

SUMMARY OF THE INVENTION

In one embodiment according to the present invention, an imaging detector system is provided. The imaging detector system includes: a radiation detector having a plurality of pixels for generating a plurality of detection signals in response to radiation, each of the pixels being used to generate a corresponding one of the detection signals; a plurality of photon counting channels, each of the photon counting channels being coupled to a corresponding one of the pixels to receive and process the corresponding one of the detection signals; a plurality of photon integrating channels, each of the photon integrating channels being coupled to a corresponding one of the pixels to receive and process the corresponding one of the detection signals; and an image processor for receiving outputs from the photon counting channels and the photon integrating channels, wherein the image processor is adapted to generate an image using the received outputs, wherein corresponding ones of the photon counting and photon integrating channels concurrently receive a same one of the detection signals.

In another exemplary embodiment according to the present invention, an imaging detector system is provided. The imaging detector system includes: a radiation detector having a plurality of pixels for generating a plurality of detection signals in response to radiation, each of the pixels being used to generate a corresponding one of the detection signals; a plurality of photon counting channels, each of the photon counting channels being coupled to a corresponding one of the pixels to receive and process the corresponding one of the detection signals; a plurality of photon integrating channels, each of the photon integrating channels being coupled to a corresponding one of the pixels to receive and process the corresponding one of the detection signals; an image processor for receiving outputs from the photon counting channels and the photon integrating channels, wherein the image processor is adapted to generate an image using the received outputs; and a switch for providing the detection signals to the photon counting channels or to the photon integrating channels.

In another exemplary embodiment according to the present invention, an imaging detector system is provided. The imaging detector system includes: a photon counting detector having a plurality of first pixels for generating a plurality of first detection signals in response to radiation, each of the first pixels being used to generate a corresponding one of the first detection signals; a photon integrating detector having a plurality of second pixels for generating a plurality of second detection signals in response to the radiation, each of the second pixels being used to generate a corresponding one of the second detection signals; a plurality of photon counting channels, each of the photon counting channels being coupled to a corresponding one of the first pixels to receive and process the corresponding one of the first detection signals; a plurality of photon integrating channels, each of the photon integrating channels being coupled to a corresponding one of the second pixels to receive and process the corresponding one of the second detection signals; and an image processor for receiving outputs from the photon counting channels and the photon integrating channels, wherein the image processor is adapted to generate an image using the received outputs.

DETAILED DESCRIPTION

In one embodiment, an imaging detector system has two parallel channels of electronic circuitry (or electronics-chain) for each detector pixel. The imaging detector system includes a radiation detector having a plurality of pixels for detecting radiation. The pixels may also be referred to as detector segments or detector elements. One channel of electronics circuitry provides information from a photon counting mode of operation, in which the energy of each individual photon is assessed. The other channel of electronics circuitry provides information from an integrating mode (or photon integrating mode) of operation. The detected radiation may be x-rays, for example.

The embodiments of the imaging detector system in accordance with the present invention will be described hereinafter primarily in reference to an x-ray detection/imaging system.

However, the present invention is not limited thereto, and may be applicable to the imaging detector system for any other suitable types of radiation.

In one embodiment, the imaging detector system takes photon counting information from all detector pixels when the signal is not adversely affected by counting saturation. Signals from the integrating mode of operation are taken from all detector pixels affected by counting saturation. The integrating mode of operation achieves proportionality of the output to the input signal at much higher radiation (e.g., x-ray) fluxes than that obtained in the photon counting mode. As discussed above, the largest x-ray flux typically occurs only at the periphery of the examined subject where x-ray attenuation is the lowest.

Using the example imaging detector, it is possible to construct an imaging detector system operating at a large dynamic range of photon fluxes including very high x-ray photon flux rates. At the same time the imaging system can take all of the advantages of photon counting and energy information in the majority of the image where photon flux is not extreme. Also, the photon counting channels can provide information about energy of the individual photons.

Another embodiment of the present invention includes an x-ray imaging system in which the x-ray photon counting rate is monitored at the output of the system at each processing channel. There is an automatic mechanism allowing for switching from photon counting mode to photon integrating mode (or current mode) in those pixels which experience very high count rates. The switching process can be automated and in addition appropriate algorithms predicting saturation based on count rate changes in neighboring pixels can be easily developed and implemented. This mechanism prevents x-ray counting saturation from occurring. The switching mechanism can be implemented in various ways.

In one embodiment, the switching mechanism can be implemented by switching the resistance value of a feedback resistor in the preamplifier circuit. This way, a preamplifier optimized for counting mode operation can be converted to a preamplifier optimized for integrating mode operation. The resulting imaging system can operate at a large dynamic range of photon flux without saturation. At the same time the imaging system makes use of all the advantages of photon counting and x-ray energy information in the majority of the image where x-ray flux is not extreme.

Another embodiment of the present invention is an x-ray imaging detector composed of two segmented detector layers. The first layer which is closer to the examined subject includes photon counting detectors. The thickness of this layer is selected so as to prevent the saturation of the detectors even at the highest photon flux. The second detector layer includes integrating detectors. The thickness of the second layer is selected to absorb the majority of the x-rays transmitted through the first layer.

The pixels (or segments) are arranged in two dimensional arrays for both layers. Therefore, the pixels in both layers are substantially matched or co-registered. In other words, the entrance apertures of the second layer pixels are arranged to capture the majority of transmitted x-rays through the corresponding pixels of the first layer. Both detector layers provide information about x-ray intensity variation. In addition, the first detector layer gives information about the variation of the number of x-ray photons as well as the energy distribution of the detected (absorbed) photons by the individual detector pixels.

In the described embodiment, because absorption properties of the first detector layer are well known, it is relatively easy from the absorbed energy spectrum to assess the energy distribution of the transmitted x-ray flux through the first layer. For this reason, it is possible to know not only x-ray intensity variations detected by second layer but also the energy distribution in the second layer. Finally, the combined information from both detector layers is used in the formation and enhancement of the image.

Figure 1:
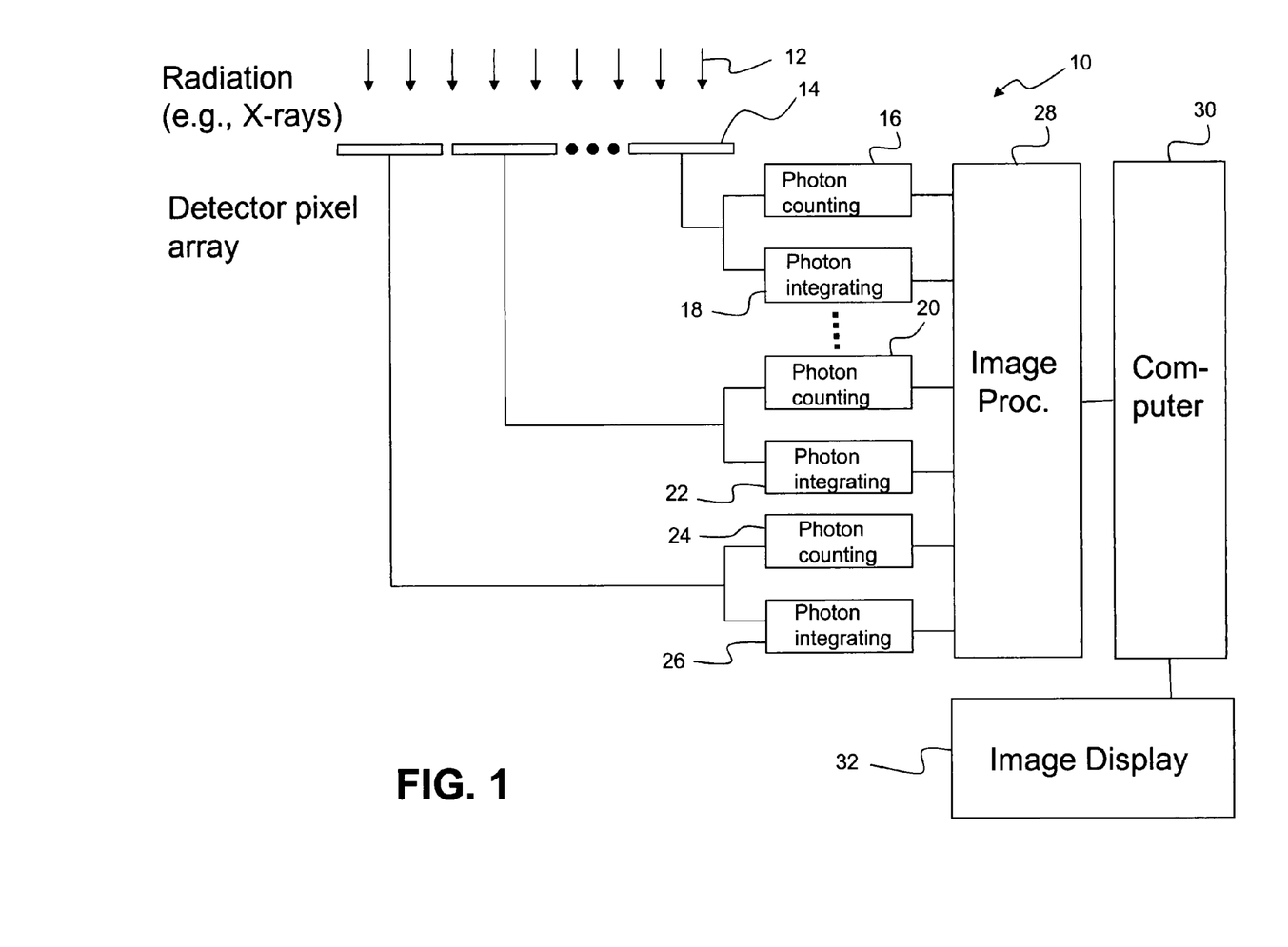
FIG. 1 is a block diagram of an imaging detector system in one embodiment according to the present invention.

FIG. 1 is a block diagram of an imaging detector system 10. The imaging detector system 10 includes a detector pixel array 14 (also referred to as "detector" herein) for receiving radiation 12. The detector pixel array 14 includes an array of pixels each configured to detect radiation. In one embodiment, the detector pixel array 14 is adapted to detect x-ray radiation.

In one embodiment, the detector pixel array 14 is fabricated of high atomic number semiconductor or compound semiconductor materials such as Cadmium Telluride (CdTe), Cadmium Zinc Telluride (CZT), Mercuric Iodide ($HgI_2$), Gallium Arsenide (GaAs) or Germanium (Ge). However, the detector can also be constructed based on scintillating crystals or any other suitable material. By way of example, in other embodiments, silicon (Si) may be used as the detector material, especially for animal or breast imaging applications utilizing low energy x-rays.

The semiconductor detectors are used in one exemplary embodiment rather than scintillating crystal based detectors because the semiconductor detectors can directly convert detected radiation (e.g., x-rays) to electrical signals. The direct conversion allows the generation of better signal to noise ratios which is highly beneficial in a photon counting mode of operation. In addition, semiconductor detectors generally provide much better energy resolution which can be utilized for image enhancements. The high atomic number of the detector material in one embodiment is for efficiently absorbing the incoming x-ray radiation.

Each detector pixel produces an electrical signal that represents not only the intensity of an incoming x-ray beam but also is capable of providing information about the number of x-ray photons as well as the x-ray photon energy for individual events. Each detector pixel is connected to amplification and processing electronics included in a pair of photon counting and integrating channels.

In the described embodiment, the amplification and processing electronics is built in a form of multi-channel Application Specific Integrated Circuits (ASIC). The amplification and processing electronics have two parallel channels (16, 18; 20, 22; 24, 26) connected to each of the individual detector pixels 14. One channel of electronics provides information from an event (e.g., individual x-ray absorption) by use of a photon counting mode of operation. The other channel of electronics provides information from an event (e.g., x-ray absorption over time) by an integrating mode of operation. The imaging detector system 10 takes photon counting information from all detector pixels 14 when the signal is not adversely affected by counting saturation. Signals from the integrating mode of operation are taken from all detector pixels 14 affected by counting saturation.

The photon counting electronics contain a set of signal amplitude discriminators and counters, in addition to amplification and signal shaping (filtering) stages. The signal amplitude discriminators and counters allow users to bin and count individual radiation detection events based on their energy. In one embodiment, the amplitude of the signal is proportional to the energy of the radiation detection event (e.g., individual x-ray absorption).

In one embodiment, the discriminator threshold levels are adjustable as desired to different energy levels with the lowest one set just above the noise level. However, there are other possible implementations of electronic circuits for sorting of individual radiation detection events based on their energy including a use of Analog-to-Digital Converter (ADC) circuits. Also, one can implement the photon counting electronics utilizing a single signal discriminator and counter to count all radiation detection events above a certain selected energy level.

The digitized data from photon counting channels 16, 20, 24 and photon integrating channels 18, 22, 26 are fed to an image processor unit (or real time data processor) 28 for fast image formatting. The digital images are then sent to a computer 30 for further processing, storage and display on a display unit 32.

Examples of image processing preformed by computer 30 can include but are not limited to the reconstruction of computer tomography (CT) images and computer assisted diagnosis (CAD). Formatting the data from the detector pixels (whether in photon counting or integrating mode or any combination of modes) directly into digital images in real time within the image processor unit 28 provides an input stream to the computer 30 for real-time CT reconstruction, for example. The computer 30 may receive additional information from an operator and may perform other functions including controlling of x-ray generation and gantry movement in a scanning system.

The ASIC electronics provides a high level of system integration and miniaturization. The design and fabrication of multi-channel ASICs combining both counting and integrating mode of operation has negligible impact on the cost of the CT system. Typically, the imaging detector system is constructed in a modular form. Individual modules utilize vertical assembly where the amplification and processing electronics is completely contained behind the two dimensional detector pixel arrays. The individual modules then can be tiled together for achieving a larger active area with a minimum dead space for detection of x-ray radiation. By making edge pixel smaller to accommodate small gaps between modules it is possible in many cases to preserve the pixel pitch from one module to another. The tiling strategy employed depends on the geometry considerations of specific applications. A collimator (not shown) is usually placed in front of the detector array to reject scattered x-ray events in a CT geometry for example.

Figure 2:
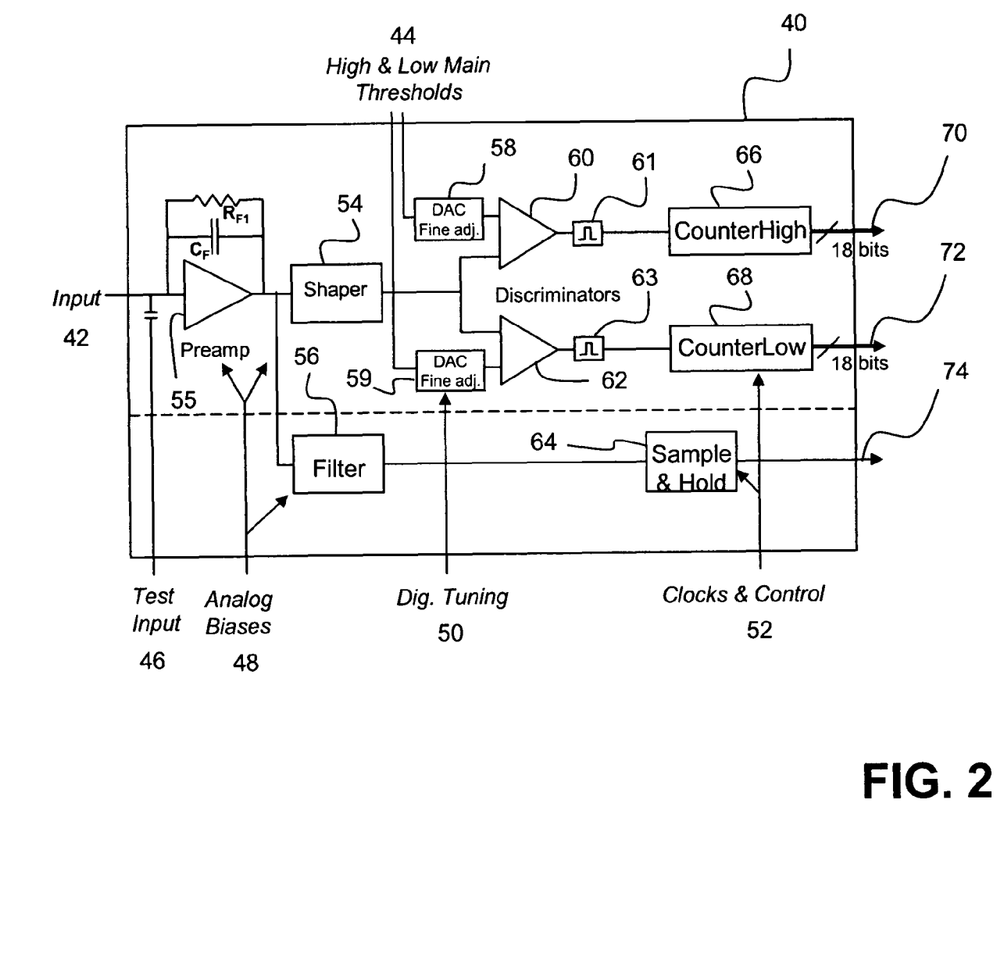
FIG. 2 is a block diagram of parallel channels of electronic circuitry (or electronics-chain) for transferring and processing electronic signals between a detector pixel and an image processor in the imaging detector system of FIG. 1.

FIG. 2 is a block diagram of parallel channels of electronic circuitry (or electronics-chain) 40 for transferring and processing electronic signals between one of the detector pixels 14 and the image processor 28 in the imaging detector system 10 of FIG. 1. The purpose of the parallel channels is to convert the radiation produced electronic signal (e.g., charge) from the detector pixel 14 into a new and desired signal entity (i.e., form).

The most conventional way of doing this in currently available commercial digital x-ray detectors is to integrate, in conventional analog manner, the signal over a defined period of time for which the integrated analog level becomes a measure of the x-ray intensity in the given pixel. This method is known as digital "current-mode" (or integration mode) radiation (e.g., x-ray) detection. A more efficient and image-enhancing way of doing this, however, is to amplify, detect and measure every charge-packet for each photon being converted in the pixel.

A preamplifier 55 and a shaper 54 work together to amplify and pulse-shape each radiation (e.g., x-ray) generated charge-packet which enters from the pixel. The preamplifier 55 receives an input 42 and is also coupled to a test input 46 for testing purposes. Analog biases 48 are respectively provided to the preamplifier 55, the shaper 54 and the filter 56 to provide suitable biasing voltages.

In one embodiment, the shaped pulse will trigger a following discriminator 60 or 62 if the amplitude reaches preset threshold level which in turn will generate one count in a consecutive binary counter 66, 68. This way, the electronics-chain will count each radiation that hits and converts in the pixel, and the digital count value of the counter over a defined period of time will become the measure of the x-ray intensity in the given pixel. This method is known as digital "photon counting" x-ray detection.

In an exemplary embodiment, the pixel sensor and the amplifier construction is made such that voltage amplitude of the pulse-shape is proportional to the x-ray energy, and by expanding the number of parallel discriminator-counter units, and letting each discriminator have different thresholds, the different counters will "sort" and count the incident x-rays into different energy bins, which leads to spectroscopic- (or "color-") information about the x-rays. This concept is known as digital "color x-ray imaging". In the described embodiment, the binning of energies is achieved by subtracting a total number of counts above a higher level from that of a number of counts above a lower level, thereby obtaining a number of photons having an energy between the higher level and the lower level. The subtraction may be performed by the image processor 28 and/or the computer 30, for example. This way, a simple practical circuit implementation of multiple bins may be achieved. In other embodiments, each bin may have its own upper and lower energy thresholds, such that no subtraction is required.

One embodiment according to the present invention is based on the usage of the color photon counting concept and is developed to prevent count-rate limitation in the electronics circuitry (or electronics-chain). The principle of this embodiment is to combine color photon counting with the current-mode principle through splitting the signal-path after the preamplifier and preparing for both types of signal forms.

FIG. 2 shows parallel channels of electronics circuitry in which the system operates in both photon counting mode and integrating mode concurrently in parallel. The current-mode (or integration mode) channel is obtained through low-pass filtering (using a filter 56) the output-pulses of the preamplifier 55 on the basis that the filtered voltage level will be analog proportional to the rate and the amplitude of the output pulses of the preamplifier and thus a measure of the x-ray generated current from the pixel. This will generate parallel x-ray intensity information to the information in the photon-counting part, but through proper design, the current-mode branch will have a dynamic range that exceeds the count-rate limit of the photon counting branch. Clocks and control signals 52 are provided to the sample & hold unit 64 for sampling and holding the filtered signal to be provided as an analog output 74.

As shown in FIG. 2, high & low main thresholds are provided to the discriminators 60 and 62 via digital-to-analog converter (DAC) fine adjustment units 58 and 59, which may be tuned using a digital tuning signal 50. To generate optimal (clock) pulses for the incrementation of the counters, the output of the discriminators 60 and 62 are provided with mono-stable function devices 61 and 63. The counters 66 and 68 respectively count the number of detection events meeting high and low thresholds.

In the described embodiment, the counter 66 has a 18-bit output 70 and the counter 68 has a 18-bit output 72. The number of bins (for counting high and low energy radiation packets) can be different in other embodiments, and the "photon counting" path of the electronics channel may have more than two counters for grouping the radiation detection events to two or more bins having different energy levels. The counters 66 and 68 and the sample & hold unit 64 receive external clocks and control signals 52.

In this and other embodiments, the photon counting and photon integrating channels may be concurrently calibrated, and may be cross-calibrated. For cross-calibration, data from both the photon detecting and integrating channels are used.

Figure 3:
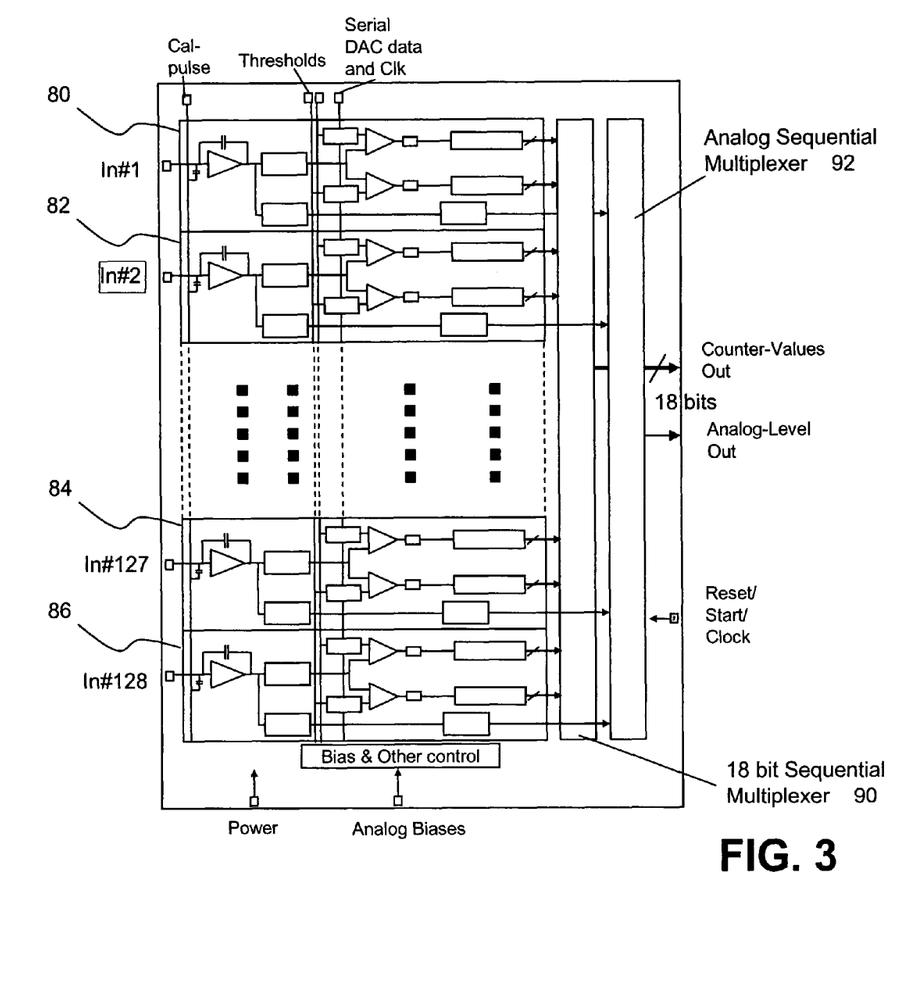
FIG. 3 is a schematic implementation diagram of an integrated circuit that includes multiple parallel channels of electronic circuitry.

FIG. 3 is a schematic diagram showing a practical implementation of integrating a large number of parallel channels of electronic circuitry (i.e., electronics-chains) jointly inside an integrated circuit (e.g., ASIC). To simplify data transport to the image processor (e.g., the image processor 28 of FIG. 1), the data from all the electronics-chains are sent through a multiplexer. In conventional (color) photon counting systems, a simple digital multiplexer is used.

As shown in FIG. 3, the integrated circuit includes a plurality of parallel channels 80 (In#1), 82 (In#2), 84 (In#127) and 86 (In#128). The channels receive a calibration pulse, power, thresholds and analog biases. The calibration pulse, for example, may be provided as the test input 46 of FIG. 2. In one embodiment, the calibration pulse is used to calibrate both the photon counting and integrating channels concurrently. The integrated circuit also receives a reset/start clock from outside of the chip. Serial DAC data and clock are also provided to the integrated circuit.

In order to accommodate both the photon counting mode and current-mode (i.e., integration mode) feature in one embodiment according to the present invention, an analog multiplexer 92 that runs in parallel with a digital multiplexer 90 is used. The digital multiplexer 90 outputs an 18-bit counter value, while the analog multiplexer 92 outputs an analog-level output.

In this way, the output from each parallel channel of electronic circuitry (or electronics-chain) in one embodiment includes a certain number of digital-counter counts from the photon counting branch, and one analog voltage level from the current-mode branch. It is also possible of course to digitize the analog current-level inside the IC (either inside each electronics-chain, or at the output of the analog multiplexer) in which case the current-mode data also will exit the integrated circuit in digital form.

Figure 4:
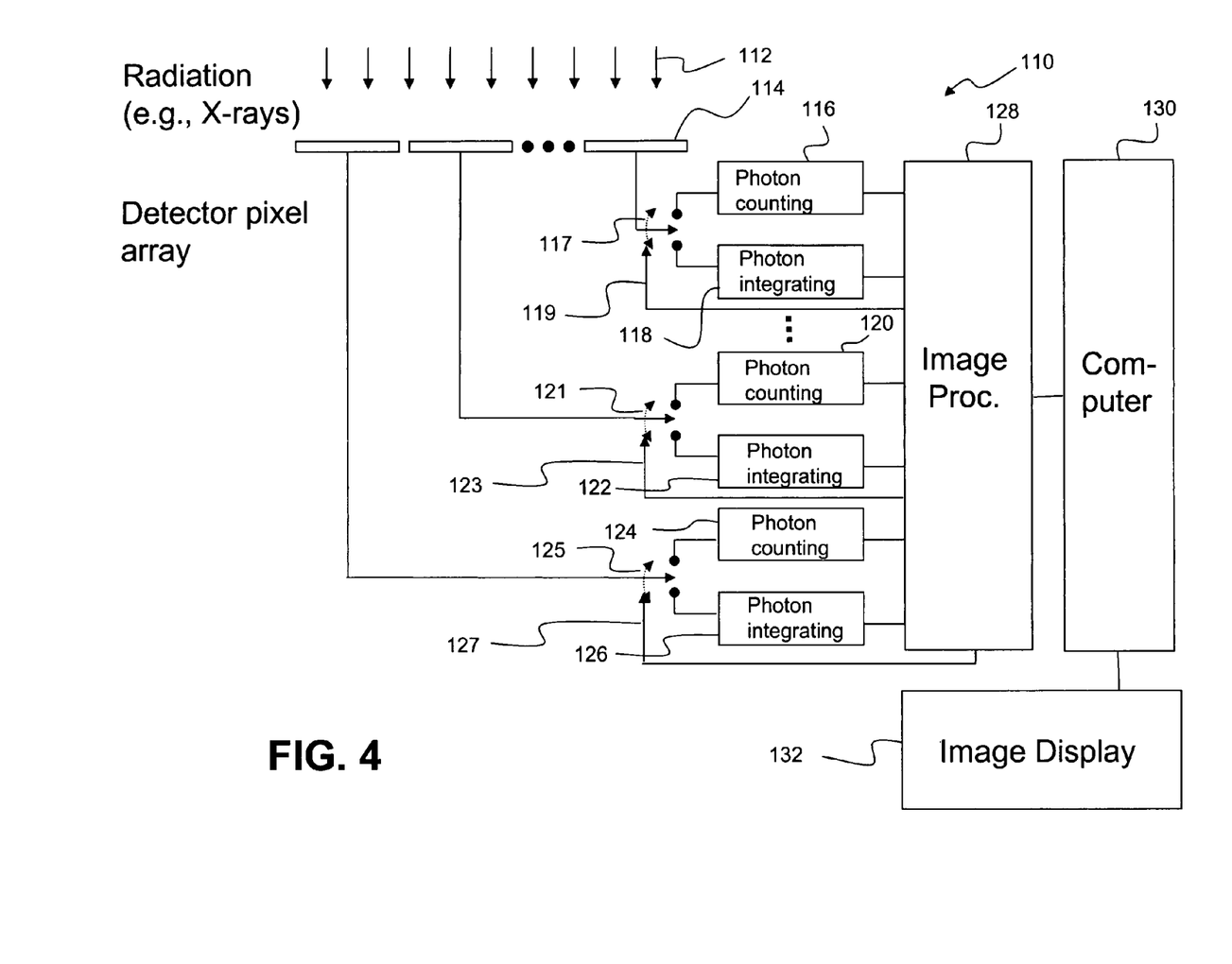
FIG. 4 is a block diagram of an imaging detector system in another embodiment according to the present invention.

FIG. 4 is a block diagram of an imaging detector system 110, which is similar to the imaging detector system 10 of FIG. 1. A difference between systems shown in FIGS. 1 and 4 is that system 110 in FIG. 4 uses the information about photon counting rates to switch the mode of operation from a counting mode to an integration mode. By way of example, when the photon counting channel is saturated through high number of photons, the electronics are switched from the photon counting mode to the photon integrating mode in one embodiment.

The imaging detector system 110 includes a detector pixel array 114, which is substantially the same as the detector pixel array 14 of FIG. 1. The detector pixel array 114 detects radiation 112, which may be x-ray radiation. Each of the detector pixels in the detector pixel array 114 provides detected signals to a corresponding one of the photon counting channels 116, 120, 124 and a corresponding one of the photon integrating channels 118, 122, 126.

The rate of photons counted by the photon counting channels 116, 120, 124 is monitored at the output of the system for each processing channel. Each of the pair of photon counting and integrating channels has an automatic switching mechanism (or switch) 117, 121 or 125 allowing for switching from counting mode to integrating (current) mode in those electronic channels which experience very high count rates.

By way of example, each of the switching mechanisms 117, 121 and 125 switches the detection signal from the corresponding photon counting channel to the corresponding integrating channel when a corresponding feedback signal 119, 123 or 127 from the image processor 128 indicates that the photon counting channel is experiencing a very high count rate (e.g., sufficient for channel saturation). This mechanism prevents x-ray counting saturation from occurring.

This embodiment may allow for better utilization of ASIC circuitry by simplifying the design and by making dual use of the same electronic circuitry for both counting and integrating modes. The switching mechanism can be implemented in many ways and in various places of the electronic circuitry.

A computer 130 and an image display 132 operate in substantially the same manner as the computer 30 and the image display 32, respectively, of FIG. 1. The image processor 128 operates similarly as the image processor 28 of FIG. 1 except that the image processor 128 provides feedback signals to indicate high photon detection rates in the photon counting channels.

Figure 5:
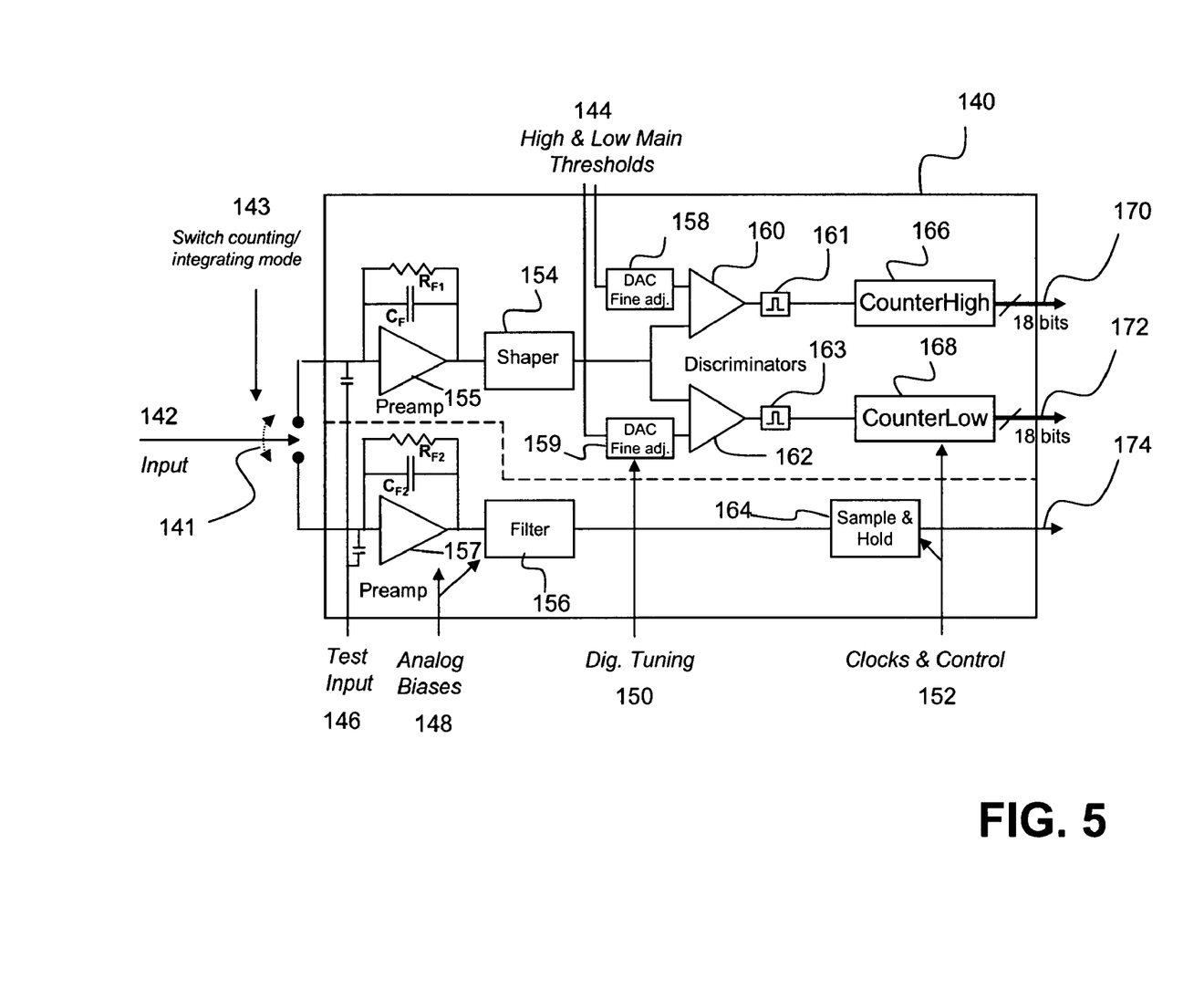
FIG. 5 is a block diagram of parallel channels of electronic circuitry (or electronics-chain) for transferring and processing electronic signals between a detector pixel and an image processor in the imaging detector system of FIG. 4.

In the embodiment shown in FIG. 5, parallel channels of electronic circuitry (or electronics-chain) 140 are used for transferring and processing electronic signals between a detector pixel 114 and the image processor 128 in the imaging detector system 110 of FIG. 4. By way of example, the parallel channels of electronic circuitry 140 correspond to one pair of the photon counting and integrating channels 116, 118; 120, 122; or 124, 126.

The operation of the electronic channel 140 is substantially the same as that of the electronic channel 40 except that an input 142 is selectively provided by an automatic switching mechanism (or switch) 141 to either the photon counting channel or the photon integrating channel based on the photon counting mode saturation as indicated by a counting/integrating mode switching signal 143.

The parallel channels of electronic circuitry 140 include a photon counting channel that contains a preamplifier 155, a shaper 154, DAC fine adjustment units 158, 159, discriminators 160, 162, mono-stable function devices 161, 163, and counters 166 and 168 that are substantially the same as the corresponding components of the photon counting channel of FIG. 2. Therefore, these components will not be explained again in detail.

The parallel channels of electronics 140 also includes a photon integrating channel that contains a filter 156 and a sample & hold circuit 164 that are substantially the same as the corresponding components of the photon integrating channel of FIG. 2. The photon integrating channel of FIG. 5 also contains a preamplifier 157 coupled with a resistor $R_{F2}$ and a capacitor $C_{F2}$ that are used to control the preamplifier gain, such that the preamplifier 155 coupled with a resistor $R_{F1}$ and a capacitor $C_F$ does not provide any input to the photon integrating channel. This way, the input 142 can be switched between the photon counting channel and the photon integrating channel.

In operation, the automatic switching mechanism (or switch) 141 connects the input 142 to the photon integrating channel or to the photon counting channel in response to a feedback signal 143 that switches between the counting mode and the integrating mode. The feedback signal 143 is one of the feedback signals 119, 123 or 127 provided by the image processor 128 in response to the photon counting mode saturation.

The parallel channels of electronic circuitry 140 are adapted to receive a test input 146 at inputs of the preamplifiers 155 and 157. The preamplifiers 155, 157, the filter 156, and the shaper 154 are also adapted to receive analog biases 148. The DAC fine adjustment units 158, 159 receive high & low main threshold signals 144 and a digital tuning signal 150. The high and low counters 166 and 168 and a sample & hold circuit 164 receive clocks and control signals 152. The counters 166 and 168 respectively provide 18-bit outputs 170 and 172 and the sample & hold circuit 164 provides an analog output 174.

Figure 6:
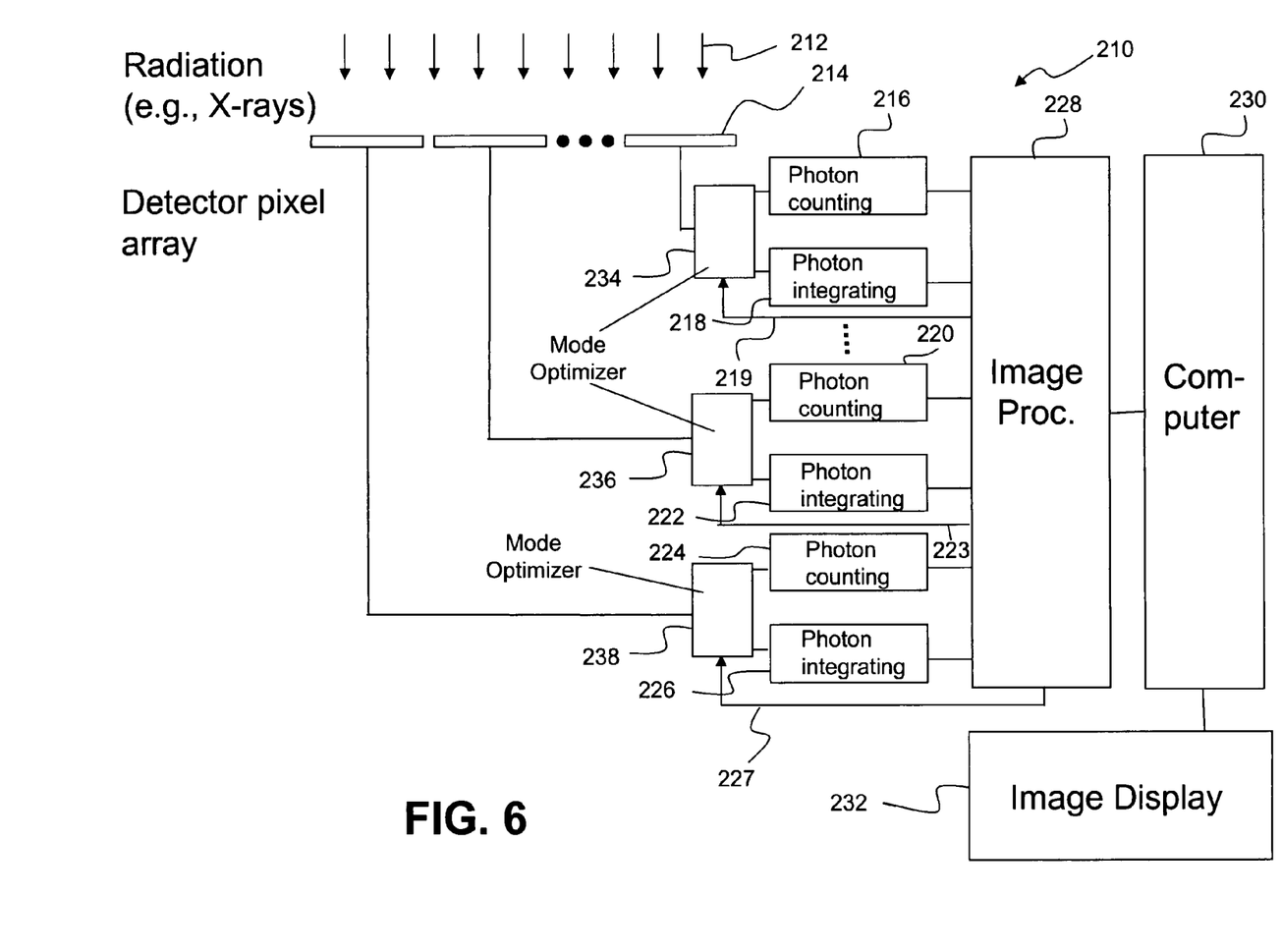
FIG. 6 is a block diagram of an imaging detector system in another embodiment according to the present invention.

FIG. 6 shows an imaging detector system 210, which is similar to the imaging detector system 110 of FIG. 4. A difference between the systems shown in FIGS. 4 and 6 is that system 210 in FIG. 6 includes a mode optimizer 234, 236 or 238 corresponding to respective parallel channels of electronic circuitry including a photon counting channel 216, 220 or 224 and a photon integrating channel 218, 222 or 226.

The imaging detector system 210 includes a detector pixel array 214, which is substantially the same as the detector pixel array 114 of FIG. 4. The detector pixel array 214 detects radiation 212, which may be x-ray radiation. Each of the detector pixels in the detector pixel array 214 provides signals to a corresponding one of photon counting channels 216, 220, 224 and a corresponding one of photon integrating channels 218, 222, 226. The output of the photon counting channels and the photon integrating channels are provided to an image processing unit 228 coupled to a computer 230. Also, an image display 232 is coupled to the computer 230.

In the described embodiment, the resistance value of a feedback resistor in the preamplifier circuit is adjusted toward optimizing the channel characteristics to accommodate either the photon counting mode or the photon integration mode. Such adjustment of the resistance value is provide by the mode optimizer 234, 236 or 238 corresponding to each parallel channels of electronic circuitry. Each of the mode optimizers receives a feedback control signal 219, 223 or 227 from the image processor 228 to be optimized for the photon counting channel or the photon integrating channel.

Figures 7, 7A:
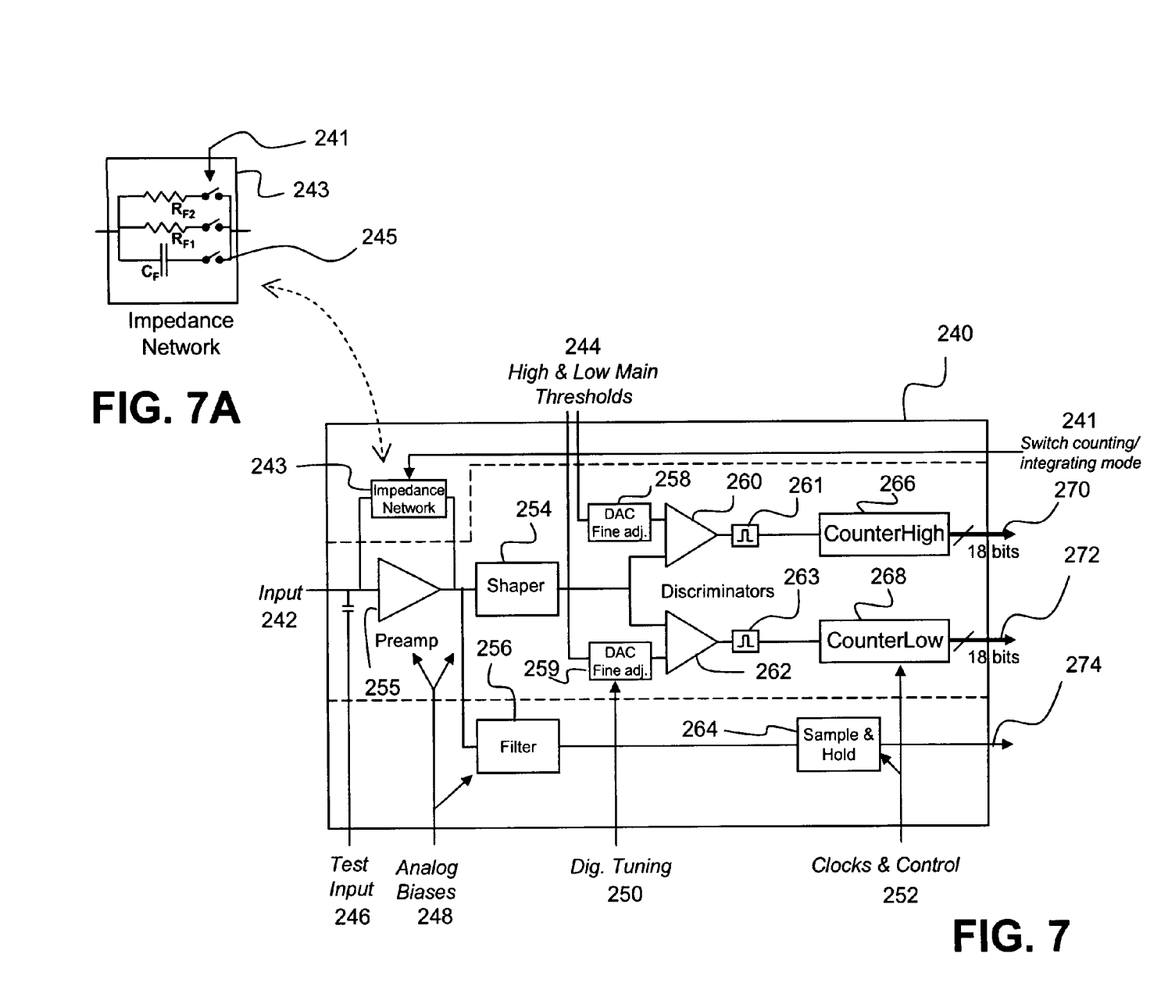
FIG. 7 is a block diagram of parallel channels of electronic circuitry (or electronics-chain) for transferring and processing electronic signals between a detector pixel and an image processor in the imaging detector system of FIG. 6.
FIG. 7A illustrates an impedance network in the electronic circuitry of FIG. 7.

In one embodiment, as shown in FIG. 7, parallel channels of electronic circuitry 240 are used for transferring and processing electronic signals between a detector pixel 214 and the image processor 228 in the imaging detector system 210 of FIG. 6. The parallel channels of electronic circuitry 240, for example, correspond to the mode optimizer (234, 236 or 238) and photon counting and integrating channels (216, 218; 220, 222; or 224, 226) as shown in FIG. 6 in the described embodiment.

The operation of the electronic channel 240 is substantially the same as that of the electronic channel 40 of FIG. 2 except that the resistance value of the preamplifier circuit is varied depending on whether the device is in the photon counting mode of operation or the photon integrating mode of operation. In more detail, a preamplifier 255 is provided with a resistance value of an impedance network 243 that receives a counting/integrating mode switching signal 241.

As can be seen in FIG. 7A, for example, the impedance network 243 includes a capacitor $C_F$ in parallel with a plurality of resistors $R_{F1}$ and $R_{F2}$. As shown in FIG. 7A, each of the resistors and the capacitor has a switch coupled to it for selectively connecting or disconnecting it in parallel with the preamplifier 255. In other embodiments, the impedance network may include other resistors (and/or capacitors) that can be selectively connected in parallel with the preamplifier. The preamplifier 255 and the impedance network 243 together may correspond to the mode optimizer 234, 236 or 238 in one exemplary embodiment. The preamplifier 255 receives an input 242.

The parallel channels of electronic circuitry 240 include a photon counting channel that contains a shaper 254, DAC fine adjustment units 258, 259, discriminators 260, 262, mono-stable function devices 261, 263, and counters 266 and 268 that are substantially the same as the corresponding components of the photon counting channel of FIG. 2. Therefore, these components will not be explained again in detail.

The parallel channels of electronics 240 also include a photon integrating channel that contains a filter 256 and a sample & hold circuit 264 that are substantially the same as the corresponding components of the photon integrating channel of FIG. 2.

In operation, the input 242 is provided to both the photon integrating channel and the photon counting channel. In response to a feedback signal 241 that switches each of the parallel channels coupled to the pixels, between the counting mode and the integrating mode, the impedance network 243 is optimized for the photon counting mode or the photon integrating mode. The feedback signal 241 is one of the feedback signals 219, 223 or 227 provided by the image processor 228 in response to the photon counting mode saturation.

The parallel channels of electronic circuitry 240 are adapted to receive a test input 246 at the input of the preamplifier 255. The preamplifiers 255, the filter 256 and the shaper 254 are also adapted to receive analog biases 248. The DAC fine adjustment units 258, 259 receive high & low main threshold signals 244 and also receive a digital tuning signal 250. The high and low counters 266 and 268 and a sample & hold circuit 264 receive clocks and control signals 252. The counters 266 and 268 respectively output 18-bit outputs 270 and 272, and the sample & hold circuit 264 outputs an analog output 274.

By adjusting the impedance network 243 using the mode switching signal 241, a preamplifier optimized for counting mode operation can be converted to a preamplifier optimized for integrating mode operation. The resulting imaging system can operate at a large dynamic range of photon flux rates without saturation. At the same time the imaging system makes use of all the advantages of photon counting and x-ray energy information in the majority of the image where x-ray flux is not extreme.

FIG. 7 shows an extension of the concept explained for FIG. 2. It is the same combination of color photon counting and current-mode, but in this case, an optimization is performed in the preamplifier circuit for optimal performance in the photon counting branch which is not coherent with the optimization of the current-mode branch, and vice versa. Such optimization is mostly determined by the feedback network of the preamplifier, and given that they, for performance optimization reasons, are typically different for the two modes, the feedback network is switched between two types of RC configurations in the described embodiment. Therefore, in the parallel channels of the electronic circuitry 240 of FIG. 7, the photon counting and integrating modes do not operate in parallel but are separately operational depending on the x-ray rate (intensity).

In order to accomplish this, digital control is used, and a method of deciding which mode the electronics-chain should be in is also provided. The current mode (or integrating mode) is used when the detection rate is above the photon counting ability, i.e., the current-mode is for the high rates and the photon counting is for the low-rates. Based on this, one way to determine the correct operational mode is through continuously detecting the counter speed locally in each electronics-chain and when it reaches a predetermined level of saturation, then switch to the current-mode feedback-network. Another way is to move the same task to the image processor 228 (see FIG. 6, for example) The advantage of the first could be that it is easier to apply the "switch to current-mode" to individual electronics-chains rather than possibly to a group of electronics-chains in the other case. There may also be other ways of automatically controlling this.

In the first example (e.g., FIG. 2) there will typically be no prior information about which branch (photon-counting or current-mode) that holds the preferred data to utilize. This will however become apparent later in the image processor. In such case, both the counting-mode multiplexer and the current-mode multiplexer are read in parallel from the IC. In the second example (e.g., FIG. 7), it may be possible to transfer only one or the other data-type from the IC (i.e., parallel channels of electronic circuitry 240).

Figure 8:
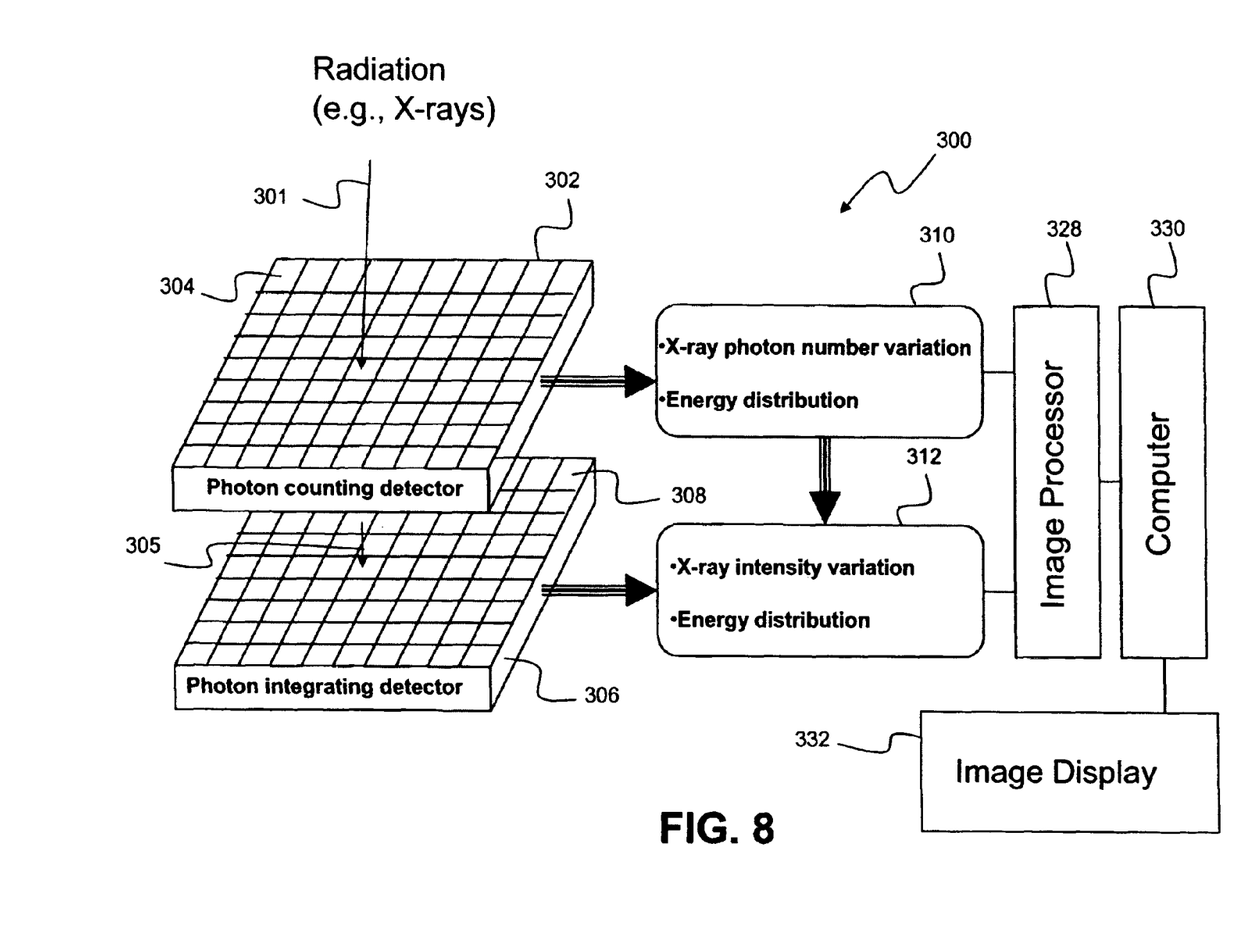
FIG. 8 is a schematic system diagram of an imaging detector system in another embodiment according to the present invention.

FIG. 8 shows another embodiment of the present invention where an x-ray imaging detector 300 is composed of two segmented detector layers 302 and 306. Hence, the detector layers 302 and 306 form a multi-layer imaging detector. First layer 302 closer to the examined subject includes photon counting detectors 304. The thickness of this layer is selected such as to prevent the saturation of the detectors even at the highest flux rates. The second detector layer 306 includes integrating detectors 308. The thickness of the second layer 306 is selected to absorb majority of the x-rays transmitted through the first layer.

The optimal thickness of detector layers depends on both applications and the detector material and size of the pixel. This means that optimal thickness can be determined based on the disclosure herein, from x-ray energy range and x-ray intensity distribution over this energy range used in this particular application and material absorption properties used for fabricating detectors. In an exemplary embodiment, the electronics of the imaging detector system can handle few million counts per second in the counting mode without saturation.

Typical size of a pixel for human CT system is about 1 mm×1 mm. The x-ray energy range for human CT typically is 30-140 keV. Those skilled in the art would be able to determine the thicknesses of the detector layers based on the disclosure herein. By way of example, in one embodiment, a CdTe or CZT detector thickness for photon counting detector may be between a few dozen to few hundred micrometers and a scintillation material based ($CdWO_4$ or equivalent) detector for photon integrating detector may be about 3 mm thick.

The pixels (or segments) are arranged in two dimensional arrays (e.g., arrays of pixels). The pixels in both layers are substantially matched. This means that the entrance apertures of the second layer pixels are arranged this way to capture majority of transmitted radiation (e.g., x-rays) 305 through corresponding pixels of the first layer 302. Both detector layers provide information about radiation intensity variation.

In addition, the first detector layer gives information (310) about variation of the x-ray photon numbers as well as energy distribution of the radiation detected (absorbed) by the individual detector pixels. Because absorption properties of the first detector layer are well known it is relatively easy from the absorbed energy spectrum to assess energy distribution of the transmitted x-ray flux through the first layer 302. For this reason it is possible to know not only radiation (e.g., x-ray) intensity variation detected by second layer but also its energy distribution (312).

Amplified and processed signals from both detector layers 302, 306 are digitized and fed to an image processor unit 328 for fast image reconstruction. The reconstructed image is sent to a computer 330 for further processing, storage and display on a display unit (e.g., image display 332). The combined information from both detector layers is used in reconstruction and enhancement of the image. Computer receives additional information from an operator while performing other functions including controlling of x-ray generation and gantry movement in a scanning system.

In one embodiment, the first layer detectors (counting detectors) are fabricated of high atomic number semiconductor or compound semiconductor materials such as Cadmium Telluride (CdTe), Cadmium Zinc Telluride (CZT), Mercuric Iodide ($HgI_2$), Gallium Arsenide (GaAs) or Germanium (Ge). The second layer detectors (integrating detectors) are based on scintillation material and constructed the same way as conventional CT detectors. Both the detectors have a suitable thickness that would be discernible to those skilled in the art.

Figure 9:
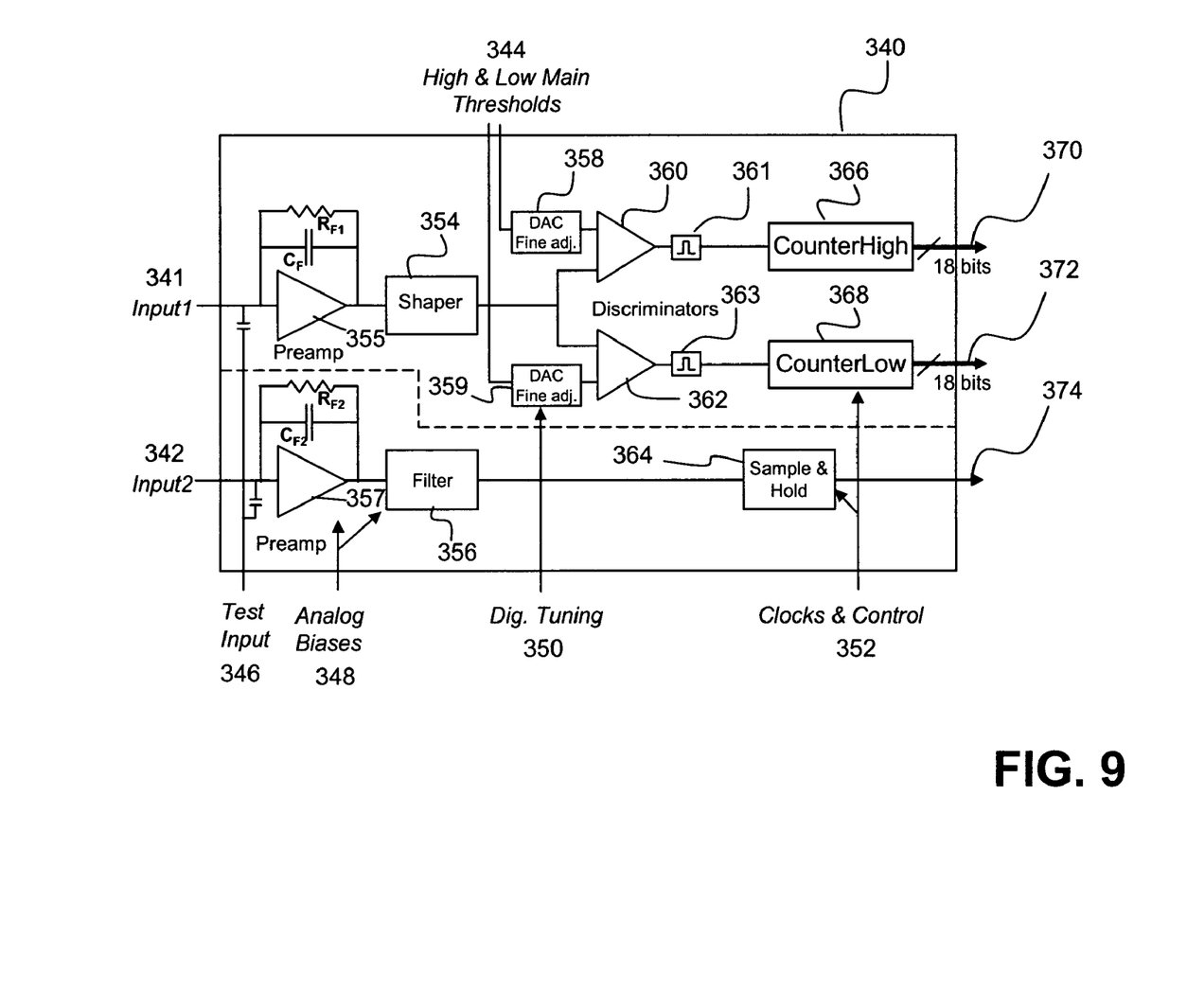
FIG. 9 is a block diagram of parallel channels of electronic circuitry (or electronics-chain) for transferring and processing electronic signals between a detector pixel and an image processor in the imaging detector system of FIG. 8.

In one embodiment, as shown in FIG. 9, parallel channels of electronic circuitry 340 are used for transferring and processing electronic signals between each of the detector pixels 304 or 308 and the image processor 328 in the imaging detector system 300 of FIG. 8. The purpose of the parallel channels is to convert the radiation produced electronic signal (e.g., charge) from the detector pixel 304 or 308 into a new and desired signal entity (form). The structure and operation of the parallel channels of electronic circuitry 340 is substantially the same as those of the parallel channels of electronic circuitry 140 of FIG. 5 except that the parallel channels of electronic circuitry 340 receive two separate inputs input 1 (341) and input 2 (342).

The parallel channels of electronics 340 include a photon counting channel including a preamplifier 355, a shaper 354, DAC fine adjustment units 358, 359, discriminators 360, 362, mono-stable function devices 361, 363, and counters 366 and 368 that are substantially the same as the corresponding components of the photon counting channel of FIG. 2 or 5. Therefore these components will not be explained again in detail.

The parallel channels of electronics 340 also includes a photon integrating channel including a filter 356 and a sample & hold circuit 364 that are substantially the same as the corresponding components of the photon integrating channel of FIG. 2. The photon integrating channel of FIG. 9 also includes a preamplifier 357 coupled in series to a resistor $R_{F2}$ and a capacitor $C_{F2}$ (i.e., impedance network) that are used to control the preamplifier gain, such that the preamplifier 355 coupled with a resistor $R_{F1}$ and a capacitor $C_F$ does not provide any input to the photon integrating channel. This way, the independently provided inputs 341 and 342 can be independently processed in the photon counting channel and the photon integrating channel, respectively.

In operation, the input 1 (341) is provided to the preamplifier 355 in the photon counting channel and the input 2 (342) is provided to the preamplifier 356 in the photon integrating channel. The parallel channels of electronic circuitry 340 are also adapted to receive a test input 346 at inputs of the preamplifiers 355 and 357. The preamplifiers 355, 357, the filter 356 and the shaper 354 are also adapted to receive analog biases 348. The DAC fine adjustment units 358, 359 receive high & low main threshold signals 344, and also receive a digital tuning signal 350. The high and low counters 366 and 368 and a sample & hold circuit 364 receive clocks and control signals 352. The counters 366 and 368 respectively output 18-bit outputs 370 and 372 and the sample & hold circuit 364 outputs an analog output 374.

While numerous embodiments of the present invention have been described herein, it will be apparent to those of ordinary skill in the art that various modifications in form and detail can be made to the described embodiments without departing from the spirit and scope of the present invention as defined by the appended claims and their equivalents.

What is claimed is:

1. An imaging detector system comprising:
a radiation detector having a plurality of pixels for generating a plurality of detection signals in response to radiation, each of the pixels being utilized to generate a corresponding one of the detection signals;
a plurality of photon counting channels, each of the photon counting channels being coupled to a corresponding one of the pixels to receive and process the corresponding one of the detection signals, wherein the photon counting channels are adapted to generate digital outputs corresponding to both number of photons and energies carried by the photons detected by the corresponding one of the pixels;
a plurality of photon integrating channels, each of the photon integrating channels being coupled to a corresponding one of the pixels to receive and process the corresponding one of the detection signals; and
an image processor for receiving outputs from the photon counting channels and the photon integrating channels, wherein the image processor is adapted to generate an image utilizing the received outputs,
wherein corresponding ones of the photon counting and photon integrating channels concurrently receive a same one of the detection signals.

2. The imaging detector system of claim 1, wherein the corresponding ones of the photon counting and photon integrating channels concurrently process the same one of the detection signals.

3. The imaging detector system of claim 1, further comprising means for configuring the system to operate in either a photon counting mode or a photon integrating mode.

4. The imaging detector system of claim 3, wherein said configuring means is adapted to switch the system between the photon counting mode and the photon integrating mode in accordance with a feedback signal from the image processor.

5. The imaging detector system of claim 3, wherein said configuring means comprises an impedance network being switchable between the photon counting mode and the photon integration mode.

6. The imaging detector system of claim 5, wherein the impedance network comprises a plurality of resistors and at least one capacitor in parallel, wherein at least one of the resistors or the capacitor is selectively connected or disconnected in response to a feedback signal from the image processor.

7. The imaging detector system of claim 3, wherein said configuring means is adapted to configure particular ones of the channels to be in a photon integrating mode when a photon counting mode is saturated.

8. The imaging detector system of claim 1, wherein the radiation comprises x-rays.

9. An imaging detector system comprising:
a radiation detector having a plurality of pixels for generating a plurality of detection signals in response to radiation, each of the pixels being utilized to generate a corresponding one of the detection signals;
a plurality of photon counting channels, each of the photon counting channels being coupled to a corresponding one of the pixels to receive and process the corresponding one of the detection signals;
a plurality of photon integrating channels, each of the photon integrating channels being coupled to a corresponding one of the pixels to receive and process the corresponding one of the detection signals; and
an image processor for receiving outputs from the photon counting channels and the photon integrating channels, wherein the image processor is adapted to generate an image utilizing the received outputs,
wherein corresponding ones of the photon counting and photon integrating channels concurrently receive a same one of the detection signals,
wherein at least one of the photon integrating channels is adapted to be concurrently calibrated with at least one of the photon counting channels.

10. The imaging detector system of claim 1, further comprising a computer for further processing an image generated by the image processor, and an image display for displaying the image.

11. An imaging detector system comprising:
a photon counting detector having a plurality of first pixels for generating a plurality of first detection signals in response to radiation, each of the first pixels being utilized to generate a corresponding one of the first detection signals;
a photon integrating detector having a plurality of second pixels for generating a plurality of second detection signals in response to the radiation, each of the second pixels being utilized to generate a corresponding one of the second detection signals;
a plurality of photon counting channels, each of the photon counting channels being coupled to a corresponding one of the first pixels to receive and process the corresponding one of the first detection signals;
a plurality of photon integrating channels, each of the photon integrating channels being coupled to a corresponding one of the second pixels to receive and process the corresponding one of the second detection signals; and
an image processor for receiving outputs from the photon counting channels and the photon integrating channels, wherein the image processor is adapted to generate an image utilizing the received outputs.

12. The imaging detector system of claim 11, wherein the photon counting detector and the photon integrating detector are disposed one on top of another.

13. The imaging detector system of claim 11, wherein the photon counting detector receives the radiation first, and the photon integrating detector receives a portion of the radiation that passes through the photon counting detector.

14. The imaging detector system of claim 13, wherein the photon counting channels and photon integrating channels are adapted to generate digital outputs corresponding to both intensity of photons and energies carried by these photons detected by the corresponding pixels.

15. The imaging detector system of claim 11 wherein the radiation comprises x-rays.

16. An imaging detector system comprising:
a radiation detector having a plurality of pixels for generating a plurality of detection signals in response to radiation, each of the pixels being used to generate a corresponding one of the detection signals;
a plurality of photon counting channels, each of the photon counting channels being coupled to a corresponding one of the pixels to receive and process the corresponding one of the detection signals, wherein the photon counting channels are adapted to generate digital outputs corresponding to both number of photons and energies carried by the photons detected by the corresponding one of the pixels;
a plurality of photon integrating channels, each of the photon integrating channels being coupled to a corresponding one of the pixels to receive and process the corresponding one of the detection signals;

an image processor for receiving outputs from the photon counting channels and the photon integrating channels, wherein the image processor is adapted to generate an image using the received outputs; and a switch for providing the detection signals to the photon counting channels or to the photon integrating channels.

17. The imaging detector system of claim 16, wherein the switch comprises a plurality of switches, each of the switches being adapted to provide a corresponding one of the detection signals to a corresponding one of the photon counting channels or a corresponding one of the photon integrating channels.

18. The imaging detector system of claim 17, wherein each of the switches is adapted to provide the corresponding one of the detection signals to the corresponding one of the photon counting channels or to the corresponding one of the photon integrating channels, in accordance with whether the corresponding one of the photon counting channels is saturated.

19. The imaging detector system of claim 18, wherein the image processor provides a feedback signal to at least one of the switches to indicate that the corresponding one of the photon counting channels is saturated.

20. The imaging detector system of claim 16, wherein the radiation comprises x-rays.

* * * * *